US007986867B2

(12) United States Patent
Gavin et al.

(10) Patent No.: US 7,986,867 B2
(45) Date of Patent: Jul. 26, 2011

(54) VIDEO DOWNLOADING AND SCRUBBING SYSTEM AND METHOD

(75) Inventors: Andrew Gavin, Pacific Palisades, CA (US); Scott Shumaker, Los Angeles, CA (US)

(73) Assignee: MySpace, Inc., Beverly Hills, CA (US)

( * ) Notice: Subject to any disclaimer, the term of this patent is extended or adjusted under 35 U.S.C. 154(b) by 0 days.

(21) Appl. No.: 12/021,272

(22) Filed: Jan. 28, 2008

(65) Prior Publication Data

US 2008/0183843 A1    Jul. 31, 2008

Related U.S. Application Data

(60) Provisional application No. 60/897,552, filed on Jan. 26, 2007, provisional application No. 60/897,558, filed on Jan. 26, 2007, provisional application No. 60/897,559, filed on Jan. 26, 2007, provisional application No. 60/897,544, filed on Jan. 26, 2007, provisional application No. 60/898,201, filed on Jan. 29, 2007, provisional application No. 60/913,204, filed on Apr. 20, 2007, provisional application No. 60/915,427, filed on May 1, 2007.

(51) Int. Cl.
*G11B 27/00* (2006.01)

(52) U.S. Cl. ........ 386/278; 386/279; 386/280; 386/281; 386/282; 386/283; 386/284; 386/285; 386/286; 386/287; 386/288; 386/289; 386/290; 386/228; 369/47.1

(58) Field of Classification Search .................... 386/278
See application file for complete search history.

(56) References Cited

U.S. PATENT DOCUMENTS

| 5,878,141 | A | * | 3/1999 | Daly et al. ................. 705/78 |
| 6,564,380 | B1 | | 5/2003 | Murphy |
| 6,952,221 | B1 | | 10/2005 | Holtz et al. |
| 6,993,787 | B1 | * | 1/2006 | Kamel et al. ............. 725/94 |
| 7,188,088 | B2 | * | 3/2007 | Iwata et al. .............. 705/59 |
| 7,356,575 | B1 | | 4/2008 | Shapiro |
| 7,882,519 | B2 | | 2/2011 | Wachtfogel et al. |
| 2002/0032663 | A1 | * | 3/2002 | Messner ..................... 705/72 |
| 2003/0023564 | A1 | | 1/2003 | Padhye et al. |
| 2003/0146915 | A1 | * | 8/2003 | Brook et al. ............. 345/473 |
| 2003/0234803 | A1 | * | 12/2003 | Toyama et al. ........... 345/716 |
| 2003/0234805 | A1 | * | 12/2003 | Toyama et al. ........... 345/723 |
| 2005/0283547 | A1 | * | 12/2005 | Parry et al. ............... 710/52 |
| 2006/0074769 | A1 | * | 4/2006 | Looney et al. ............ 705/26 |
| 2006/0156219 | A1 | * | 7/2006 | Haot et al. ............... 715/500.1 |
| 2006/0168303 | A1 | | 7/2006 | Oyama et al. |

(Continued)

OTHER PUBLICATIONS

"Planning and Using Infomercial Campaigns Effectively" dated Sep. 1, 1995 by Gene Silverman and published in Direct Marketing (hereinafter "Silverman"), pp. 1 to 8, each page attached as a separate file.*

(Continued)

*Primary Examiner* — Kirsten S Apple
(74) *Attorney, Agent, or Firm* — Cantor Colburn LLP

(57) ABSTRACT

A video downloading and scrubbing system for use with a web-based video editing system is provided. The downloading and scrubbing system includes: a scrubbing subsystem configured to: receive a user request for a portion of a video at a particular time index; create a data stream beginning containing video data relating to that time index in the video; and transmit the data; and a preview subsystem configured to provide a preview of video data to the user prior to the user completing the download of the video.

10 Claims, 7 Drawing Sheets

U.S. PATENT DOCUMENTS

| | | | |
|---|---|---|---|
| 2006/0184980 A1* | 8/2006 | Cole | 725/88 |
| 2006/0253542 A1* | 11/2006 | McCausland et al. | 709/207 |
| 2006/0288392 A1* | 12/2006 | Fleming | 725/94 |
| 2007/0189708 A1* | 8/2007 | Lerman et al. | 386/52 |
| 2008/0052090 A1* | 2/2008 | Heinemann et al. | 705/1 |
| 2008/0143875 A1* | 6/2008 | Scott et al. | 348/512 |

OTHER PUBLICATIONS

"Planning and Using Infomercial Campaigns Effectively" dated Sep. 1, 1995 by Gene Silverman and published in Direct Marketing (hereinafter "Silverman"), pp. 1 to 8, each page attached as a separate file.—Copies already given to the Applicant with Non-Final Rejection mailed out on Dec. 15, 2008.*

International Search Report for Application No. PCT/US08/01139 filed Jan. 28, 2008, dated May 14, 2008, mailed Jun. 2, 2008, 2 pages.

Written Opinion for Application No. PCT/US08/01139 filed Jan. 28, 2008, dated May 14, 2008, mailed Jun. 2, 2008, 4 pages.

Furini, et al., An Audio/Video Analysis Mechanism for Web Indexing, ACM, May 22-26, 2006, pp. 1-2.

* cited by examiner

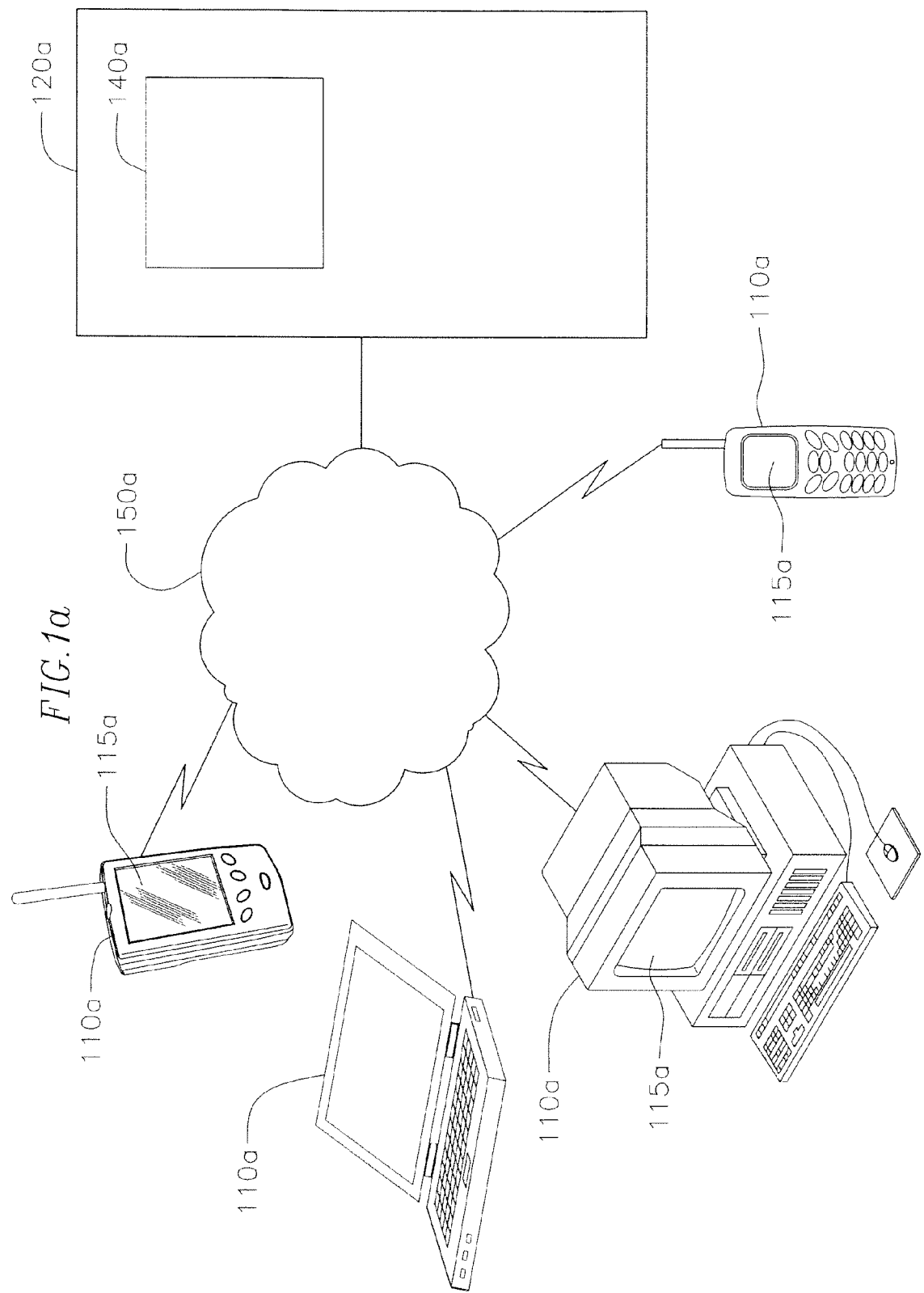

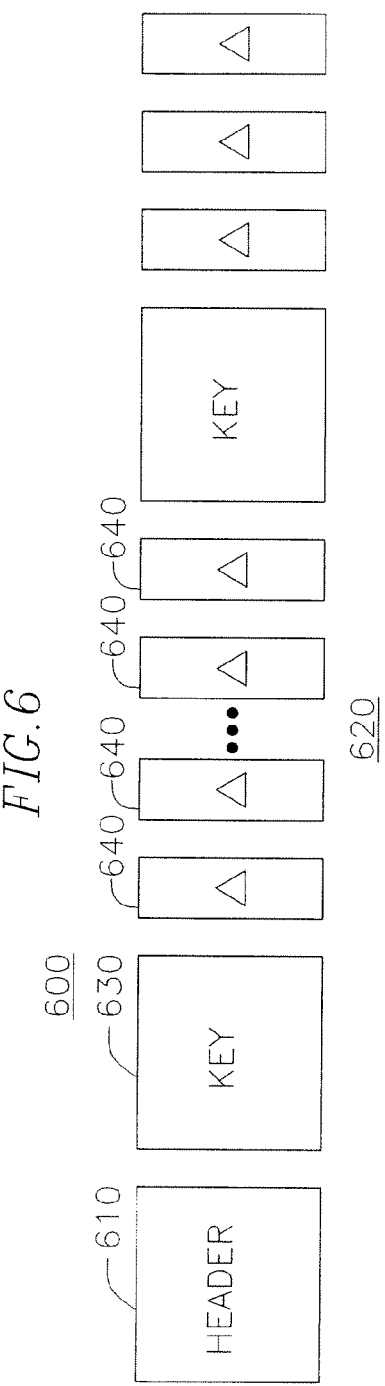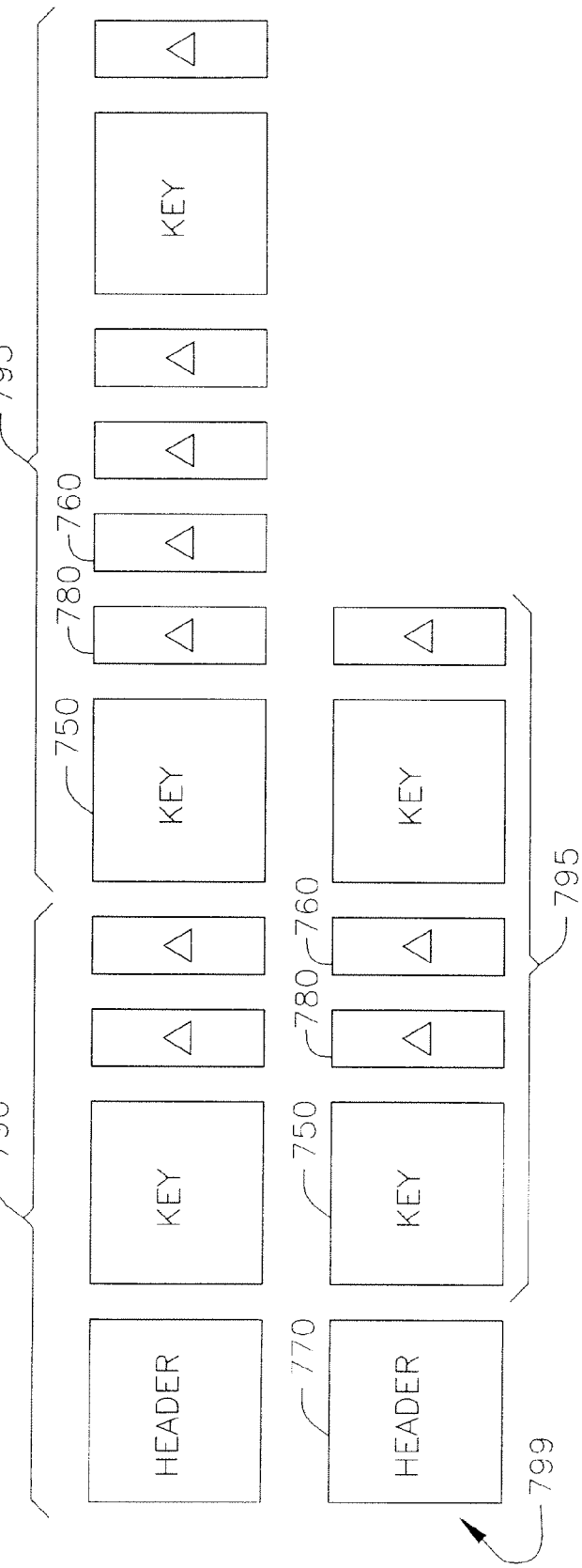

VIDEO DOWNLOADING AND SCRUBBING SYSTEM AND METHOD

This application claims priority to and the benefit of U.S. Provisional Application No. 60/897,552, filed on Jan. 26, 2007, which is incorporated by reference as if set forth in full herein. This application is also related to the co-pending U.S. Provisional Patent Application No. 60/897,558, filed on Jan. 26, 2007, titled "Real Time Online Video Editing System and Method", U.S. Provisional Patent Application No. 60/897,559, filed on Jan. 26, 2007, titled "Payment System and Method for Web-Based Video Editing System", U.S. Provisional Patent Application No. 60/897,544, filed on Jan. 26, 2007, titled "System and Method for Editing Web-Based Video", U.S. Provisional Patent Application No. 60/898,201, filed on Jan. 29, 2007, titled "Image Editing System and Method", U.S. Provisional Patent Application No. 60/913,204, filed on Apr. 20, 2007, titled "Image Editing System and Method", and U.S. Provisional Patent Application No. 60/915,427, filed on May 1, 2007, titled "System and Method for Flow Control in Web-Based Movie Editing System", the entire contents of each of which are expressly incorporated herein by reference.

FIELD OF THE INVENTION

The present invention relates to video downloading and scrubbing systems, and more particularly to a video downloading and scrubbing system and method for web-based video editing systems.

BRIEF DESCRIPTION OF THE DRAWINGS

FIG. 1a is a block diagram of a web-based video editing system according to some embodiments of the present invention.

FIG. 6 shows a sample representation of video files with delta encoding.

FIG. 7 shows a sample representation of the video files with delta encoding and the manner in which the system manipulates them.

DETAILED DESCRIPTION OF THE INVENTION

In a traditional online video player program, the video player downloads video files and scrubs to specific time indexes in one of several ways. The first method, known as progressive downloading, involves downloading the entire video file at once. The data for the file is downloaded sequentially, thus the video player first downloads the data for the first frame of the video, followed by the next frame, and so forth until it reaches the last frame. As the player downloads the file, the user may play the downloaded portion of the file and may scrub to any portion of the video that has already been downloaded. If the user attempts to scrub past this point, the video player will typically scrub to the end of the downloaded portion of the file and will stop playing. Similarly, when the user is playing the file as it is being downloaded, if, due to lag, slow connection speed, or some other reason, the file plays faster than the remaining portion can be downloaded, the video player will halt play when it reaches the end of the downloaded portion of the file.

Figure 1:
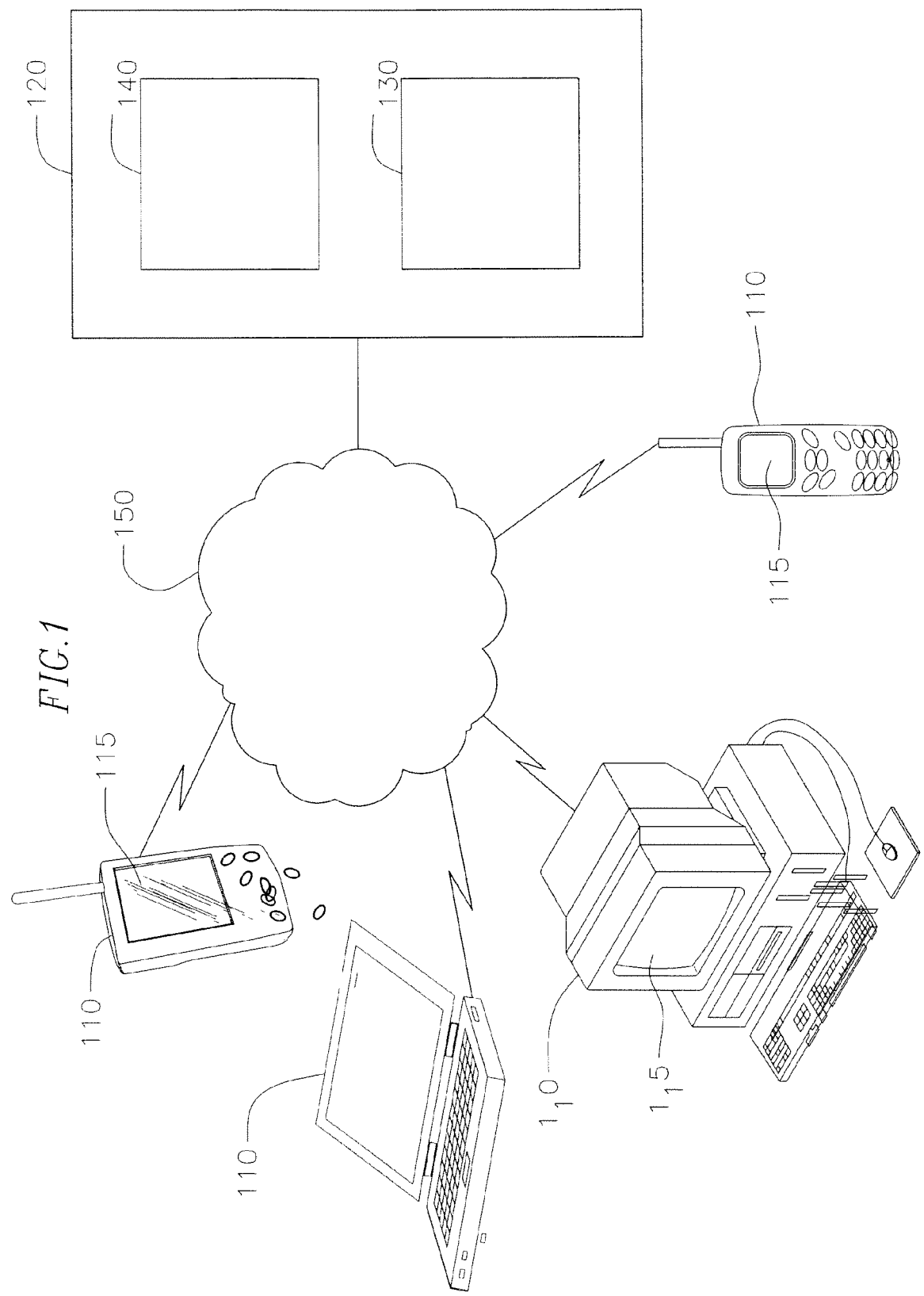
FIG. 1 is a block diagram of a web-based video editing system according to a first embodiment of the present invention.

FIG. 1 is a block diagram of a web-based video editing system according to a first embodiment of the present invention. The editing system includes one or more communication devices 110 each having a graphical user interface 115, a server 120 having a connection manager 130 and a video downloading and scrubbing system 140 operating on the server, and a network 150 over which the one or more communication devices and the server communicate. The communication devices may include, but are not limited to, a personal computer, a mobile telephone, a PDA, or any other communication device configured to operate as a client computer to the server. In some embodiments, a user may operate the communication device to develop a web-based video to be displayed on the graphical user interface. The network to which the server and devices are coupled may be a wireless or a wireline network and may range in size from a local area network to a wide area network to the Internet. A dedicated open socket connection exists between the connection manager and the communication devices.

FIG. 1a is a block diagram of some embodiments of the web-based video editing system of FIG. 1. In these embodiments, the system does not include a connection manager for communication between the client computer and the server. Otherwise, client computer 110a is an instance of client computer 110, graphical user interface 115a is an instance of graphical user interface 115, server 120a is an instance of server 120, video downloading and scrubbing system 140a is an instance of video downloading and scrubbing system 140, and internet 150a is an instance of internet 150. All the components in FIG. 1a are thus identical to those in FIG. 1, and they are all configured to operate as described in FIG. 1.

In some embodiments of the system, one or more client computers are configured to transmit information to and receive information from the server. In some embodiments, each of the client computers is configured to send a query for information and the server is configured to respond to the query by sending the requested information to the client computer. In another embodiment, one or more of the client computers is configured to transmit commands to the server and the server is configured to perform functions in response to the commands.

In some embodiments, each of the client computers is configured with an application for displaying multimedia on the graphical user interface of the client computer. The application may be Adobe Flash® or any other application capable of displaying multimedia.

In some embodiments, videos are as stored as files on the server or on a remote computer connected to the server. The files may be Flash FLV format files or any other file suitable for storing videos that can be downloaded to a client computer.

In some embodiments, the connection manager is configured to determine the condition of the server and perform asynchronous messaging to one or more of the client computers over the dedicated open socket connection. In some embodiments, the content of the message is indicative of the state of the server.

The server is configured to receive requests from one or more of the client computers and perform functions in response to the received requests. The server performs any number of functions typically performed on the server of a web-based video editing system. In some embodiments, the server provides a video downloading and scrubbing system for the web-based video editing system.

In some embodiments, the video downloading and scrubbing system is executed on the server. In other embodiments, the video downloading and scrubbing system may be executed on a computer that is remote from but in communication with the server. The video downloading and scrubbing system is configured to allow a user to download all or portions of a video, scrub to specified time indices within the video once it has been downloaded, scrub to specified time indices in a video that is currently being downloaded, scrub to specified time indices in a video that has not yet started to download, and scrub to specified time indices within all or portions of a video without experiencing significant lag time.

Figure 2:
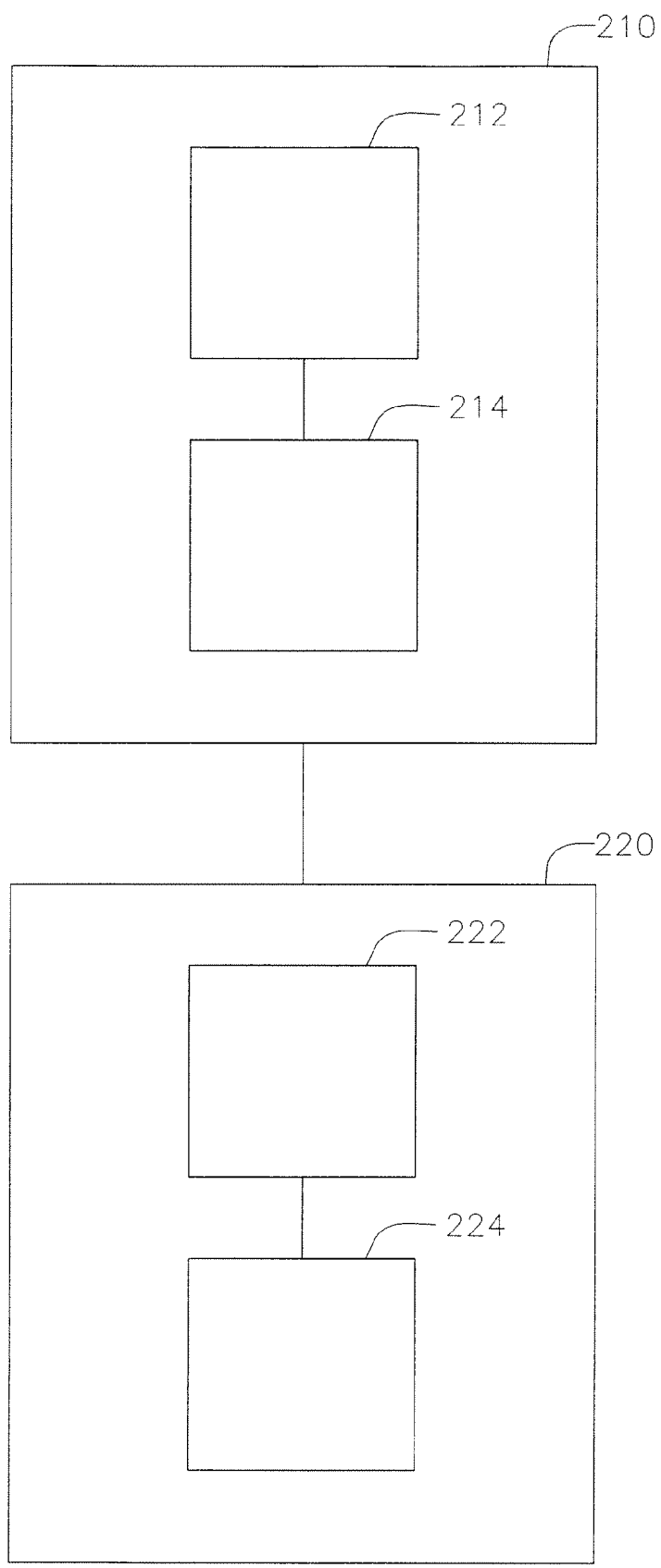
FIG. 2 is a block diagram of an embodiment of a video downloading and scrubbing system of the web-based video editing system of FIG. 1.

FIG. 2 is a block diagram of an embodiment of a video downloading and scrubbing system of the web-based video editing system of FIG. 1. The video downloading and scrubbing system includes a scrubbing subsystem 210 and a preview subsystem 220. In some embodiments, the scrubbing subsystem includes a processor 212, memory 214, and computer code product including instructions stored in the memory and adapted to cause the processor, and thereby the scrubbing subsystem, to receive and process user scrubbing requests. The memory also stores information indicative of the user scrubbing requests. The memory may be any type of read-write memory, including, but not limited to, random access memory. In some embodiments, the scrubbing subsystem receives input from the user including the identity of the user, the video the user wishes to view, and the time index in the video to which the user wishes to scrub.

The video may be stored in the editing system of the server (not shown), the scrubbing subsystem memory 214, the preview subsystem memory 224, or at a remote location connected to the network of FIG. 1. The videos may be data provided by the web-based video editing system or data generated by the user.

Still referring to FIG. 2, in some embodiments, the preview subsystem includes a processor 222, memory 224, and computer code product including instructions stored on the memory and adapted to cause the processor, and thereby the preview subsystem, to receive and process user preview requests or preview requests from the scrubbing subsystem. The memory also stores information indicative of the requests from the scrubbing subsystem. The memory may be any type of read-write memory, including, but not limited to, random access memory. In some embodiments, the preview subsystem receives input from the user including the identity of the user, the video the user wishes to view, and the time index in the video to which the user wishes to scrub. In some embodiments, the preview subsystem receives this input from the scrubbing subsystem.

In some embodiments, the preview subsystem generates previews frames. These preview frames may be selected from throughout the video or they may be from a particular portion of the video. For example, the frames may be selected from periods of time contiguous to that which the user has requested to scrub.

In some embodiments, the preview subsystem receives further input relating to the quality or resolution of the preview and generates preview frames of that quality or resolution.

Figure 3:
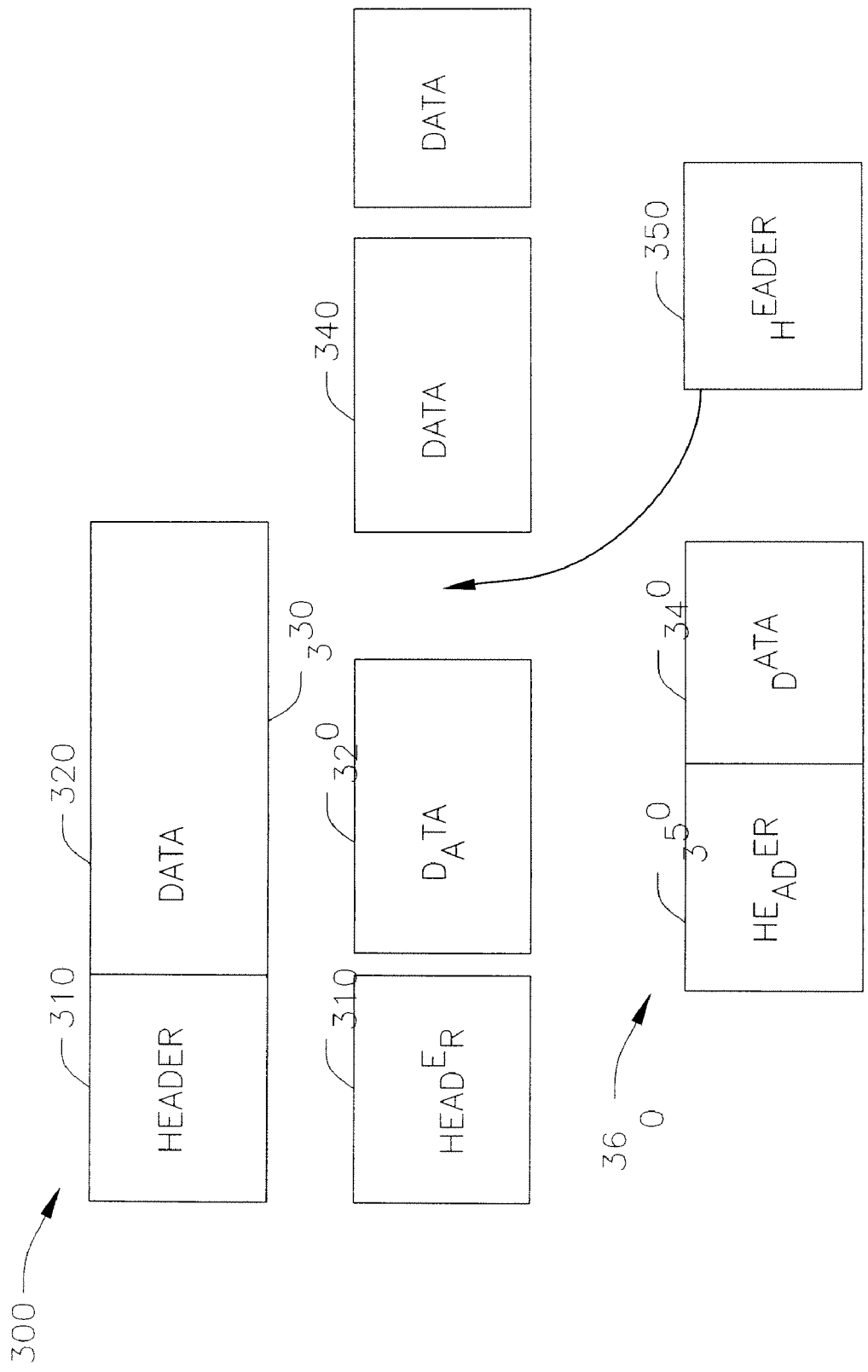
FIG. 3 shows a diagram of one representation of the video files' composition and the manner in which the scrubbing system edits and manipulates them.

FIG. 3 shows a diagram of one representation of the video files' composition and the manner in which the scrubbing system edits and manipulates them. Video file 300 includes a header 310 and data 320. The header includes a signature, flags, a version number, an offset, and/or any other variables or information necessary for a video editor or player to recognize and process the file. The data includes a stream of tags including one or more fields including fields for a timestamp, the previous tag size, the body length, padding, type of tag, and any other fields relating to data for a video file. Each of the tags contains packets of audio, video, or meta data.

In some embodiments, when dealing with smaller size video files, the system receives input from the user indicating the time index to which he desires to scrub. The system opens the video file 300, locates the point 330 in the data 320 within the file 300 that corresponds to the input for the user selected time index, and splices out the data 340 following that point. Splicing includes any combination of copying to a new location in memory, providing pointers to particular location in memory, tagging particular locations in the file, or any other acceptable method or means for selecting data from a file and later streaming it to the client computer.

The amount of the data that is spliced varies for each embodiment. In some embodiments, the data only corresponds to a small snippet of the video. In other embodiments, the snippet of data only corresponds to the portion of the video that the particular user has been editing. No matter the embodiment, the snippet of data is generally smaller in size than the original file. Once the snippet has been located and spliced, the system appends a new header 350 to the beginning of the snippet. In some embodiments, appending the header data may, for example, involve streaming header data to the client computer and subsequently streaming the spliced data. In other embodiments, appending the header may, for example, involve creating a new file containing the header and the spliced data. The above examples for appending header data are illustrative only as persons having ordinary skill in the art would recognize.

As a result of appending a new header, a new video file 360 has been created containing only the portions of the video the user wishes to view and beginning at the time index to which the user indicated he wishes to scrub. Because the new file has the appropriate header data, it operates as any other video file would and any video player would download the new file and allow it to be viewed as if it were an original file because the video player will process the file as if it is downloading a full and complete video file. For example, if the user begins to view a one minute file and scrubs to the time index corresponding to 30 seconds within the video, the system will splice a portion of the video file data beginning at the 30 second mark and will append a new header to the portion. The system will then transmit the new smaller file to the client computer.

Figure 4:
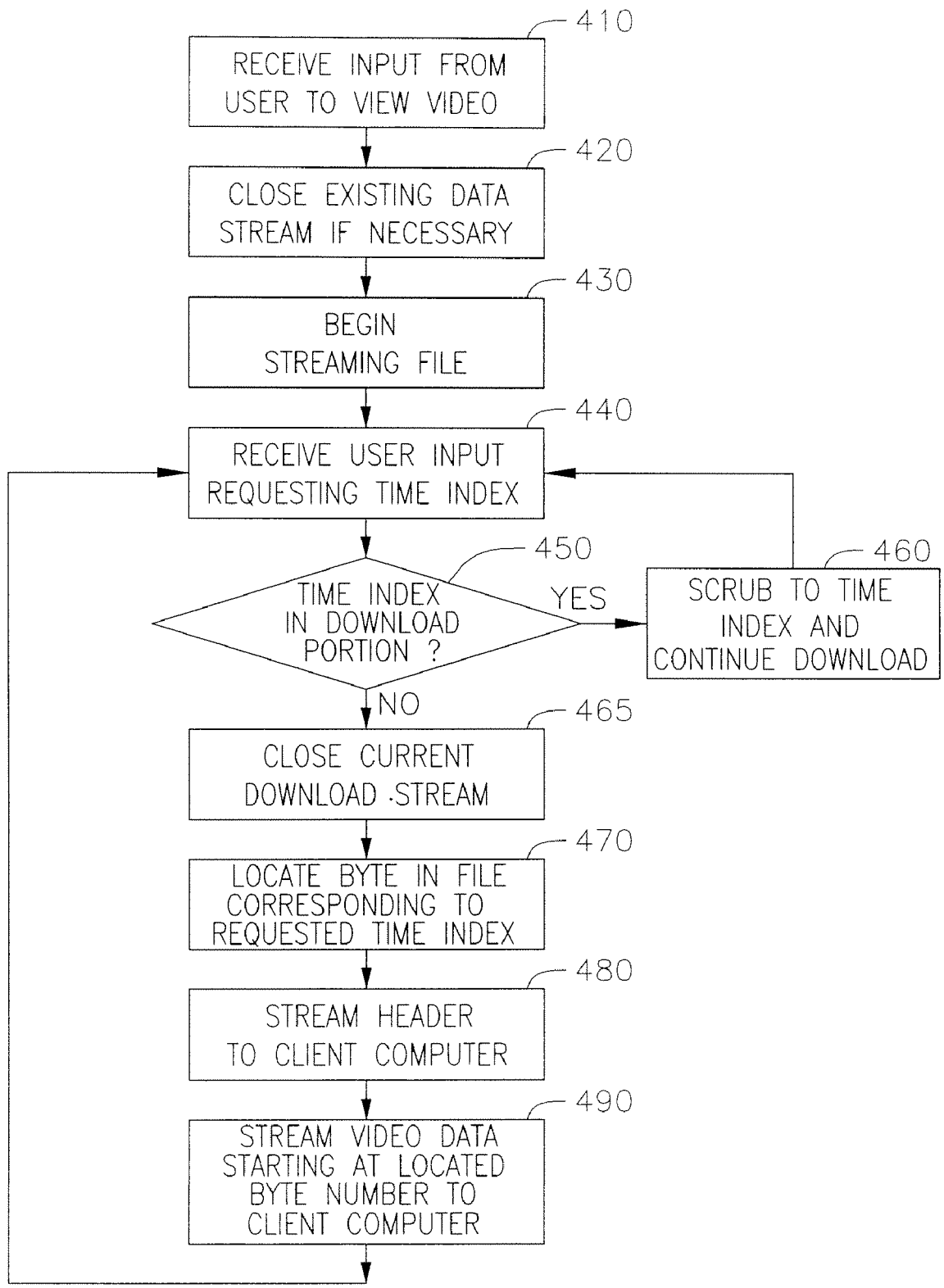
FIG. 4 shows a block diagram of the process by which the system transmits large video files.

FIG. 4 shows a block diagram of the process by which the system transmits large video files. In some embodiments, dealing with larger video files, the system receives 410 input from a user indicating that he wishes to view a video file. In some embodiments where the user may only view one video at a time, the system closes 420 any existing video data stream to the client computer. The system then transmits 430 the video file to the client computer. The client computer progressively downloads the video file from the beginning of the file. In progressive downloading, the client computer begins downloading the video file from the beginning. As the download progresses, the user may scrub to any time index in the video so long as the data within the video corresponding to that time index has already been downloaded to the client computer.

While the larger file is downloading to the client computer, the system may receive 440 input from the user indicating that he wishes to scrub to another time index within the video. If the system determines 450 that this time index occurs at a position in the file that has already been downloaded, the system scrubs 460 to that time index on the client computer and continues to download the file. If the system determines 450 that the time index occurs in a portion of the file that has not yet been downloaded, the system closes 465 the data stream for the video file currently downloading and locates 470 the byte number in the video file on the server that corresponds with the time index requested by the user. The system then streams 480 header data to the client computer and then transmits 490 this video file to the client computer, and the client computer begins to progressively download the new file. As this new file progressively downloads, the user may scrub to any time index corresponding to a downloaded portion of the file. In some embodiments, the system maintains a time line that shows the length of the original video and the time index in the original video even though the video currently being downloaded begins at the selected time index and contains no data for the portion of the video that would proceed it in the original time index.

If, while the new video file is downloading, the system receives input indicating the user wishes to scrub to a portion of the video that occurs before the beginning of the new video file, the system closes the video file/stream that is currently being downloaded. The system opens the original video file and locates the byte number in the file corresponding to the newly selected time index. The system then truncates the video data at that point and appends a header to the beginning portion of the data. At this point, the new video file consists of the entirety of the original video data except for any point that occurs before the user selected time index. The client computer then begins progressively downloading and playing this new video file. As this new video file downloads, the user may scrub to any portion of the file that has already been downloaded.

Further, if the user attempts to scrub to a time index in the video that occurs past the downloaded portion, the system will once again close the current video file and create a new video file for download as described above and shown in FIG. 4.

Figure 5:
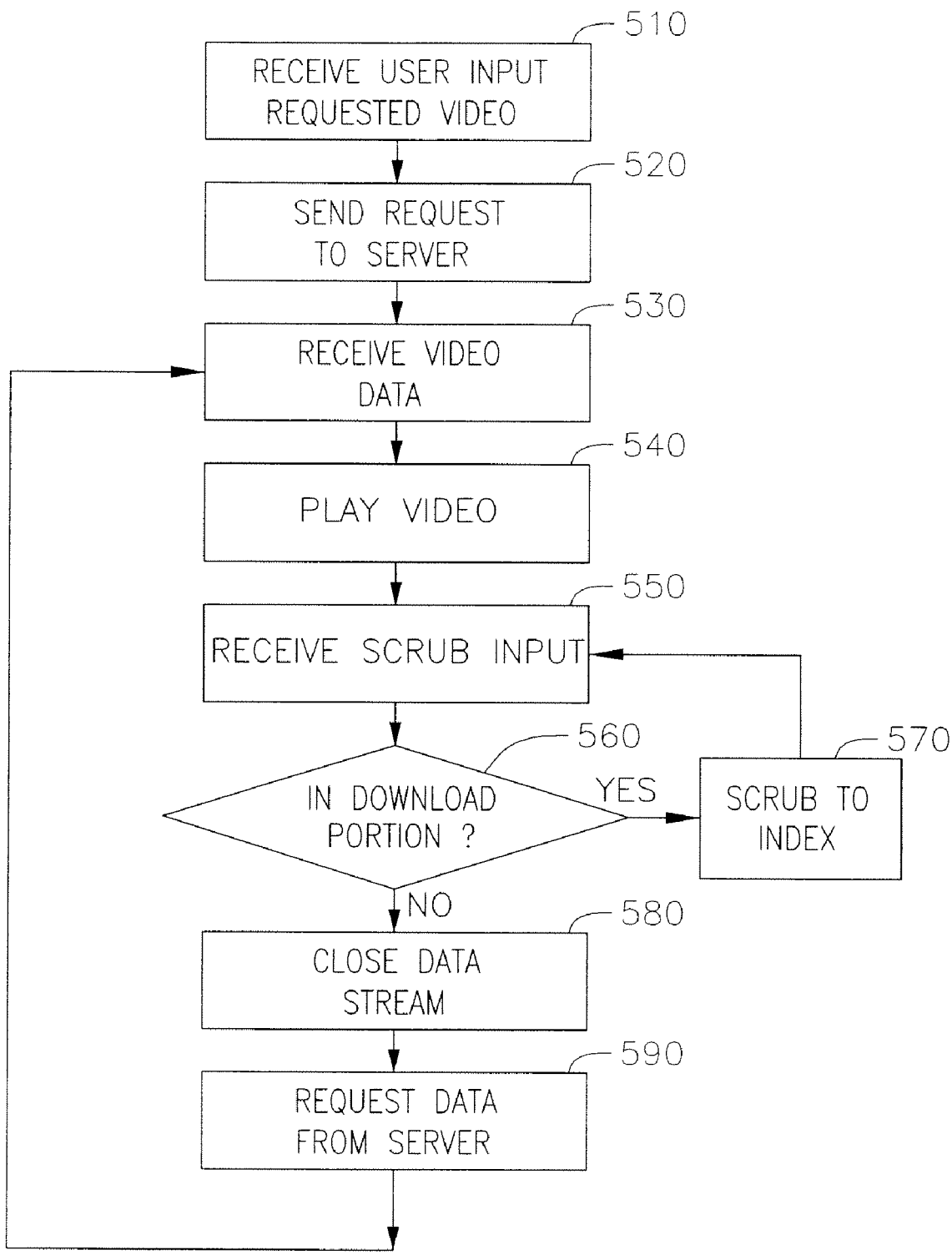
FIG. 5 shows a flowchart diagram of a method of operation on the client computer for processing user input.

FIG. 5 shows a flowchart diagram of a method of operation on the client computer for processing user input. When the system receives 510 input from the user requesting a particular video, the client computer sends 520 a request to the server for data corresponding to the video. The client begins receiving 530 the video data, processes, and plays 540 the video as it downloads. The player continues to download and play the video until it receives 550 input from the user indicating that the user wishes to scrub to a different time index. The system then determines 560 whether the time index is within the already downloaded portion of the video. If it is, the system scrubs 570 to that time index within the video and continues to play and download the video until it receives 550 further input indicating that the user wishes to scrub to another time index. If, instead, the system determines 560 that the time index is not within the already downloaded portion of the video, the system closes 580 the current data stream and sends 590 a request to the server for that time index. The system then begins receiving 530 new video data that begins at that time index.

In some embodiments, meta data is injected into the video files containing the byte number in the file for frames in the video. This meta data also contains the time index for the corresponding frame. Depending on the embodiment and preferences during implementation, the meta data includes this information for the time index and byte number for each frame, for every set number of frames, or for any other process of selecting frames that best suits the needs of the current implementation. The system uses this data to locate the byte number for the frame corresponding to the time index selected by the user. In some embodiments, the meta data is in the form of two arrays.

FIG. 6 shows a sample representation of video files with delta encoding. In some embodiments, the system includes files using delta encoding. Delta encoding is a way of storing or transmitting data in the form of differences between sequential data rather than as complete files. The files 600 include a header 610 and data 620. The header 610 includes a signature, flags, a version number, an offset, and any other variables or information necessary for a video editor or player to recognize and process the file. The data 620 includes a stream of tags including one or more fields including fields for a timestamp, the previous tag size, the body length, padding, type of tag, and any other fields relating to data for a video file. Each of the tags contains packets of audio, video, or meta data. The video packets are encoded using delta encoding and include a series of keyframes 630 and delta frames 640. The data for each keyframe 630 contains data corresponding to the entire image for one frame of the video. The intervening delta frames 640 contain only the data for the changes in the image from the preceding frame. For example, if only three pixels change between one frame and the next, the data for the second frame would only include the information necessary to indicate the change in those three pixels rather than data for the entire image in the second frame. As a result, the delta frames are much smaller in size than the key frames. The number of key frames in a video varies per each video; however, the file size of the video increases greatly to coincide with its number of key frames whereas an increase in the number of delta frames does not greatly increase the file size.

In some embodiments, the video files are in Flash FLV format including delta encoding.

In some embodiments, the video files are also injected with meta data in the form of two arrays that contain the byte number and time index for each key frame in a video file. This metadata allows the video player to accurately seek within the video and do accurate re-buffering of the video file despite potentially only having been sent a section of the file.

According to another embodiment of the invention, referring to FIG. 7, when the system receives input from the client computer indicating that the user wishes to scrub to a particular time index of the video clip, the system locates in the video file on the server the last key frame 750 that precedes the frame 760 corresponding to the requested time index, truncates all the previous data 790 in the file, and appends the remaining portion of the file 795 to the new header 770. The server then streams the file 799 to the client computer, and the client begins downloading the file as if this were the entirety of the file. In some embodiments, appending the header data involves, for example, streaming header data to the client computer and subsequently streaming the spliced data. In other embodiments, appending the header involves, for example, creating a new file containing the header and the spliced data. The system transmits additional data to the viewer portion of the client computer system instructing it to not display the audio or visual aspects of the file 799 until it reaches the frame 760 corresponding to the requested time index.

Thus, the client begins downloading the file beginning at the nearest key frame 750 and applies each of the intervening delta frames 780 to the key frame 750 until it reaches the delta frame 760 corresponding to the requested time index. The client computer processes the intervening delta frames in real time or processes them at the fastest possible speed for the computer. Because the size of the delta frames is extremely small in comparison to the size of the key frames, and the system has only had to download one key frame, download time is greatly decreased. As a result, the system has rapidly scrubbed to the requested time index without having to download a large amount of data. The system then makes the video visible and audible from this point forward. The user then can scrub to any time index within the downloaded portion of the file. If the user attempts to scrub to a time index before the file downloading began or to a time index that occurs after the portion of the file that has already been downloaded, the system will create a new file in the above manner that begins at that time index and will transmit it to the client.

In another embodiment of the above described invention, the server maintains two versions of each video file, one that is completely delta encoded, and one that has a large number of key frames. This keyframe-heavy version is designed to be used in a web-based video editor, and frequent keyframes facilitate interactive scrubbing and video cropping because most client video implementations can only scrub to keyframes. However, frequent keyframes greatly increase the size of video, so it is desirable to use the delta-encoded version of a video when downloaded by an audience. In some embodiments, after the editor adjustments are made, a new copy of the video is rendered out in delta-encoded form for audience viewing. In some embodiments, a new copy of the video is generated in response to a client request by combining a heavily delta-encoded version of the video with the editor version of the video. In this approach, when the video was initially encoded, two versions are generated by the system—a keyframe-heavy editor version of the video, and a heavily delta-encoded version of the video with keyframes spaced at large intervals, such as once per second. The system generates a video file by generating a header and initial keyframe using the editor video, as described above. The system then uses a server-side decoder to decode the delta frames and thus generate full keyframes and appends these keyframes to the generated video file. In some embodiments, the system uses the keyframe-heavy video to generate the keyframes, and in other embodiments, the system uses the delta-encoded version of the video. The system continues this process until a corresponding keyframe is reached in the delta-encoded version of the video. Finally, the delta-encoded version of the video is then appended to the generated file. This file can be cached or streamed to the client computer as described in the other embodiments, above.

In another embodiment, the video downloading and scrubbing system includes a preview subsystem. The preview subsystem may receive user input from the client computer indicating a time index to which a user wishes to scrub. The preview subsystem then locates the frame corresponding to the time index and splices only that frame out of the file, or it splices the nearest keyframe if delta encoding is being used. The preview subsystem then transmits this frame to the client computer and the client computer then displays this frame as a preview as the video downloads. The scrubbing system also starts transmitting the video file to the client computer system in any of the above described manners.

In another embodiment, the preview subsystem divides every video into a series of scenes. What constitutes a scene can be determined by a variety of factors. For example, when a user is editing a video, the user may arbitrarily place markers indicating the beginning and ending of each scene. The subsystem may also classify each individual video clip added to a project as a separate scene. The system may also automatically search for places in the video that could constitute a break between scenes such as areas where the screen is completely black, where there is no sound, or where a user has added a transition. When a user begins downloading a video to the client computer, the preview subsystem selects one or more frames from each scene within the video and transmits the frames to the client computer while the rest of the video, or portion of the video, downloads. The client computer displays these preview frames in order such that the user sees an approximate representation of the goings-on in each scene of the video before the entire video has downloaded. In this manner, the user sees the entire layout of the video without having downloaded the entire file and may use this as a guide to determine to what point in the video he or she may wish to scrub while the video is still being downloaded. Further, in some embodiments, when the user scrubs to a particular time index within the video, the preview subsystem generates a higher concentration of frames from the surrounding scenes (e.g., three frames per scene at different points in each scene rather than only one frame per scene) to help further guide the user in scrubbing within this portion of the video.

In another embodiment, a video is divided into a series of discrete files on the server. The full file is divided at any point where there is a hard cut in the video, such as where there is a transition or a scene change. Once the file has been divided into a series of discrete files, the system stores information relating to the time indices contained in each file in any manner suitable for processing by a video editor or video player. For example, each file may contain two arrays containing the byte number and time index for each frame. In this embodiment, the server transmits the files to the client computer, and the client computer stitches them back together to form a complete video file. If the system receives input from the client computer indicating that the user wishes to scrub to a time index of the video that has not yet been downloaded, the system closes the current download stream and start transmitting the portion of the video that has already been downloaded. Further, the client computer stores in memory any portions of the video that have completed download and stitches them together with any contiguous portions such that the client computer does not need to download them again should the system receive input indicating that the user wishes to scrub to a time index within one of those portions. This allows the client computer to download videos and to scrub to specific time indices in much the same manner as the above described embodiments. This embodiment also permits the client computer to store discrete sections of the video in memory so that it does not have to redownload portions of the video that have already been downloaded. In some embodiments, the system locates hardcuts by searching for areas in the video where there are simultaneous breaks in both the audio and visual portions of the video. In some embodiments of the invention, the system may stitch together otherwise separate video clips into one video file.

In some embodiments, when the system receives a request for a video from the client computer, the system first determines whether it already has a cached version of the video file. For example, if the client computer requests a portion of the video running from the third second in the video to the tenth second in the video, the system will determine whether a file for this portion of the video has already been created, either for that client computer or for another client computer. If such a file already exists, then the server will transmit this file to the client computer. If not, then the server will generate a new video file according to any method described above or by any other suitable method.

In some embodiments, the name of the video file and the desired portion (start and end times) of the video are encoded together to form a unique filename for the video file. Thus, when caching sections of video files on disk or in memory, the system encodes this information into a unique filename. The system may thus locate a given section of video by encoding the name and requested time indices into a filename and by then checking the file system for that filename. In some embodiments, this information is stored in a database, which maps from the filename and section to a unique file on disk or in memory.

What is claimed is:

1. A video downloading and scrubbing system for use with a web-based video editing system, the downloading and scrubbing system comprising:
    a video server including a network output that transmits data, including video data, to a first remote communication device over a network and a network input that receives data from a second remote communication device over the network, the video server configured to:
       send an initial file of video data to the first remote communication device using the network output, the initial file of video data including an initial file header portion and an initial file data portion
       receive, before the initial file of video data has been completely sent, a request for a portion of the video data corresponding to a particular time index from the second remote computer using the network input;
       determine what portion of the file of video data has been sent;
       when it is determined that the video data corresponding to the particular time index is in the portion of the initial file of video data that has been sent, continue sending the initial file of video data; and
       when it is determined that the video data corresponding to the particular time index is not in the portion of the initial file of video data that has been sent,
    create a scrubbed file of video data, the scrubbed file of video data including a scrubbed header portion and a scrubbed data portion, the scrubbed data portion including the video data corresponding to the particular time index within a predetermined portion of the video data at the beginning of the scrubbed data portion;
    stop sending the initial file of video data, and
    send the scrubbed file of video data to the first remote communication device using the network output.

2. The system of claim 1, wherein a single communication device is both the first remote communication device and the second remote communication device.

3. The system of claim 1, wherein the first remote communication device comprises a graphical user interface.

4. The system of claim 3, wherein the first remote communication device comprises at least one selected from the group consisting of: a personal computer, a laptop computer, a handheld computer, a phone, and a video player.

5. The system of claim 1, wherein the network is the Internet.

6. A method of downloading and scrubbing video data for use with a video server including a network output that transmits data, including video data, to a first remote computer over a network and a network input that receives data from a second remote computer over the network, the method comprising:
    sending an initial file of video data to the first remote computer using the network output, the initial file including an initial file header portion and an initial file data portion;
    receiving, before the initial file of video data has been completely sent, a request for a portion of the video data corresponding to a particular time index from the second remote computer using the network input;
    determining what portion of the initial file of video data has been sent;
    when it is determined that the video data corresponding to the particular time index is in the portion of the initial file of video data that has been sent, continuing to send the initial file of video data; and
    when it is determined that the video data corresponding to the particular time index is not in the portion of the initial file of video data that has been sent,
       creating a scrubbed file of video data, the scrubbed file of video data including a scrubbed header portion and a scrubbed data portion, the scrubbed data portion including the video data corresponding to the particular time index within a predetermined portion of the video data at the beginning of the scrubbed data portion,
       ceasing sending the initial file of video data, and
       sending the scrubbed file of video data to the first remote computer using the network output.

7. The method of claim 6, wherein a single communication device is both the first remote communication device and the second remote communication device.

8. The method of claim 6, wherein the first remote communication device includes a graphical user interface.

9. The method of claim 8, wherein the first remote communication device comprises at least one selected from the group consisting of a personal computer, a laptop computer, a handheld computer, a phone, and a video player.

10. The method of claim 6, wherein the network is the Internet.

* * * * *